United States Patent
Xu et al.

(10) Patent No.: US 12,309,702 B2
(45) Date of Patent: May 20, 2025

(54) WAKE UP SIGNAL POOL FOR WAKING UP MULTIPLE USER EQUIPMENTS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/754,979

(22) PCT Filed: Nov. 18, 2019

(86) PCT No.: PCT/CN2019/119104
§ 371 (c)(1),
(2) Date: Apr. 18, 2022

(87) PCT Pub. No.: WO2021/097596
PCT Pub. Date: May 27, 2021

(65) Prior Publication Data
US 2022/0386240 A1    Dec. 1, 2022

(51) Int. Cl.
*H04W 52/02* (2009.01)
(52) U.S. Cl.
CPC .............................. *H04W 52/0235* (2013.01)
(58) Field of Classification Search
CPC ............ H04W 68/02; H04W 52/0235; H04W 52/0216; H04W 52/028; H04W 52/0229;
(Continued)

(56) References Cited

U.S. PATENT DOCUMENTS 9,525,540 B1    12/2016  Shellhammer et al.
2012/0275364 A1  11/2012  Anderson et al.
(Continued)

FOREIGN PATENT DOCUMENTS

CN    104981015 A  * 10/2015
CN    107735975      2/2018
(Continued)

OTHER PUBLICATIONS

Huawei., et al., "Feature Lead Summary of Wake-up Signal Configurations and Procedures in NB-Iot", 3GPP TSG RAN WG1 Meeting #93, R1-1807471, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 24, 2018, 18 Pages, XP051463161, pp. 1-18.
(Continued)

*Primary Examiner* — David Q Nguyen
(74) *Attorney, Agent, or Firm* — Harrity & Harrity, LLP

(57) ABSTRACT

Various aspects of the present disclosure generally relate to wireless communication. In some aspects, a user equipment (UE) may monitor a subset of time resources in a wake up signal (WUS) pool, wherein the WUS pool includes contiguous candidate time resources for receiving a WUS. The UE may detect the WUS based at least in part on monitoring the subset of time resources. Numerous other aspects are provided.

30 Claims, 17 Drawing Sheets

(58) Field of Classification Search
CPC ... H04W 76/28; H04W 72/23; H04W 72/535; H04L 5/0053; H04L 1/08; H04L 5/001; Y02D 30/70
USPC .......................... 370/328, 329, 330, 331, 311
See application file for complete search history.

(56) References Cited

U.S. PATENT DOCUMENTS

| | | | | |
|---|---|---|---|---|
| 2014/0064170 | A1* | 3/2014 | Seo | H04W 52/0235 |
| | | | | 370/311 |
| 2018/0270756 | A1 | 9/2018 | Bhattad et al. | |
| 2018/0279274 | A1* | 9/2018 | Sun | H04W 52/367 |
| 2019/0223164 | A1* | 7/2019 | He | H04W 76/27 |
| 2019/0349856 | A1 | 11/2019 | Liu et al. | |
| 2021/0259044 | A1* | 8/2021 | Islam | H04W 52/0229 |
| 2021/0329558 | A1* | 10/2021 | Yang | H04W 52/0216 |
| 2022/0132426 | A1* | 4/2022 | Zhou | H04W 72/23 |

FOREIGN PATENT DOCUMENTS

| | | | |
|---|---|---|---|
| CN | 109155973 | A | 1/2019 |
| CN | 110463285 | A | 11/2019 |
| EP | 3823220 | A1 * 5/2021 ......... H04B 7/15507 |
| WO | WO-2012149319 | A1 | 11/2012 |
| WO | WO-2016204933 | A1 | 12/2016 |

OTHER PUBLICATIONS

Supplementary European Search Report—EP19953188—Search Authority—The Hague—Jul. 14, 2023.
International Search Report and Written Opinion—PCT/CN2020/119104—ISAEPO—Aug. 18, 2020.
Qualcomm Incorporated: "UE-Group Wake-Up Signal for MTC", 3GPP Draft, 3GPP TSG-RAN WG1 #98bis, R1-1910716, Chongqing, China, Oct. 14-20, 2019, pp. 1-6.
Qualcomm Incorporated: "UE-Group Wake-Up Signal for NB-Iot", 3GPP Draft, 3GPP TSG-RAN WG1 #98bis, R1-1910725, Chongqing, China, Oct. 14-20, 2019, pp. 1-3.

* cited by examiner

WAKE UP SIGNAL POOL FOR WAKING UP MULTIPLE USER EQUIPMENTS

CROSS-REFERENCE TO RELATED APPLICATION

This application is a 371 national stage of PCT Application No. PCT/CN2019/119104 filed on Nov. 18, 2019, entitled "WAKE UP SIGNAL POOL FOR WAKING UP MULTIPLE USER EQUIPMENTS," which is hereby expressly incorporated by reference herein.

FIELD OF THE DISCLOSURE

Aspects of the present disclosure generally relate to wireless communication and to techniques and apparatuses for transmitting a wakeup signal (WUS) pool for waking up multiple user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include monitoring a subset of time resources in a wake up signal (WUS) pool, where the WUS pool includes contiguous candidate time resources for receiving a WUS. The method may include detecting the WUS based at least in part on monitoring the subset of time resources.

In some aspects, a method of wireless communication, performed by a base station, may include transmitting a signaling communication that indicates a WUS pool to monitor for a WUS, where the WUS pool includes contiguous candidate time resources for receiving the WUS. The method may include transmitting the WUS in the WUS pool.

In some aspects, a UE for wireless communication may include memory and one or more processors operatively coupled to the memory. The memory and the one or more processors may be configured to monitor a subset of time resources in a WUS pool, where the WUS pool includes contiguous candidate time resources for receiving a WUS. The memory and the one or more processors may be configured to detect the WUS based at least in part on monitoring the subset of time resources.

In some aspects, a base station for wireless communication may include memory and one or more processors operatively coupled to the memory. The memory and the one or more processors may be configured to transmit a signaling communication that indicates a WUS pool to monitor for a WUS, where the WUS pool includes contiguous candidate time resources for receiving the WUS. The memory and the one or more processors may be configured to transmit the WUS in the WUS pool.

In some aspects, a non-transitory computer-readable medium may store one or more instructions for wireless communication. The one or more instructions, when executed by one or more processors of a base station, may cause the one or more processors to monitor a subset of time resources in a WUS pool, where the WUS pool includes contiguous candidate time resources for receiving a WUS, and detect the WUS based at least in part on monitoring the subset of time resources.

In some aspects, a non-transitory computer-readable medium may store one or more instructions for wireless communication. The one or more instructions, when executed by one or more processors of a base station, may cause the one or more processors to transmit a signaling communication that indicates a WUS pool to monitor for a WUS, where the WUS pool includes contiguous candidate time resources for receiving the WUS, and transmit the WUS in the WUS pool.

In some aspects, an apparatus for wireless communication may include means for monitoring a subset of time resources in a WUS pool, where the WUS pool includes contiguous candidate time resources for receiving a WUS, and means for detecting the WUS based at least in part on monitoring the subset of time resources.

In some aspects, an apparatus for wireless communication may include means for transmitting a signaling communication that indicates a WUS pool to monitor for a WUS, where the WUS pool includes contiguous candidate time resources for receiving the WUS, and means for transmitting the WUS in the WUS pool.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
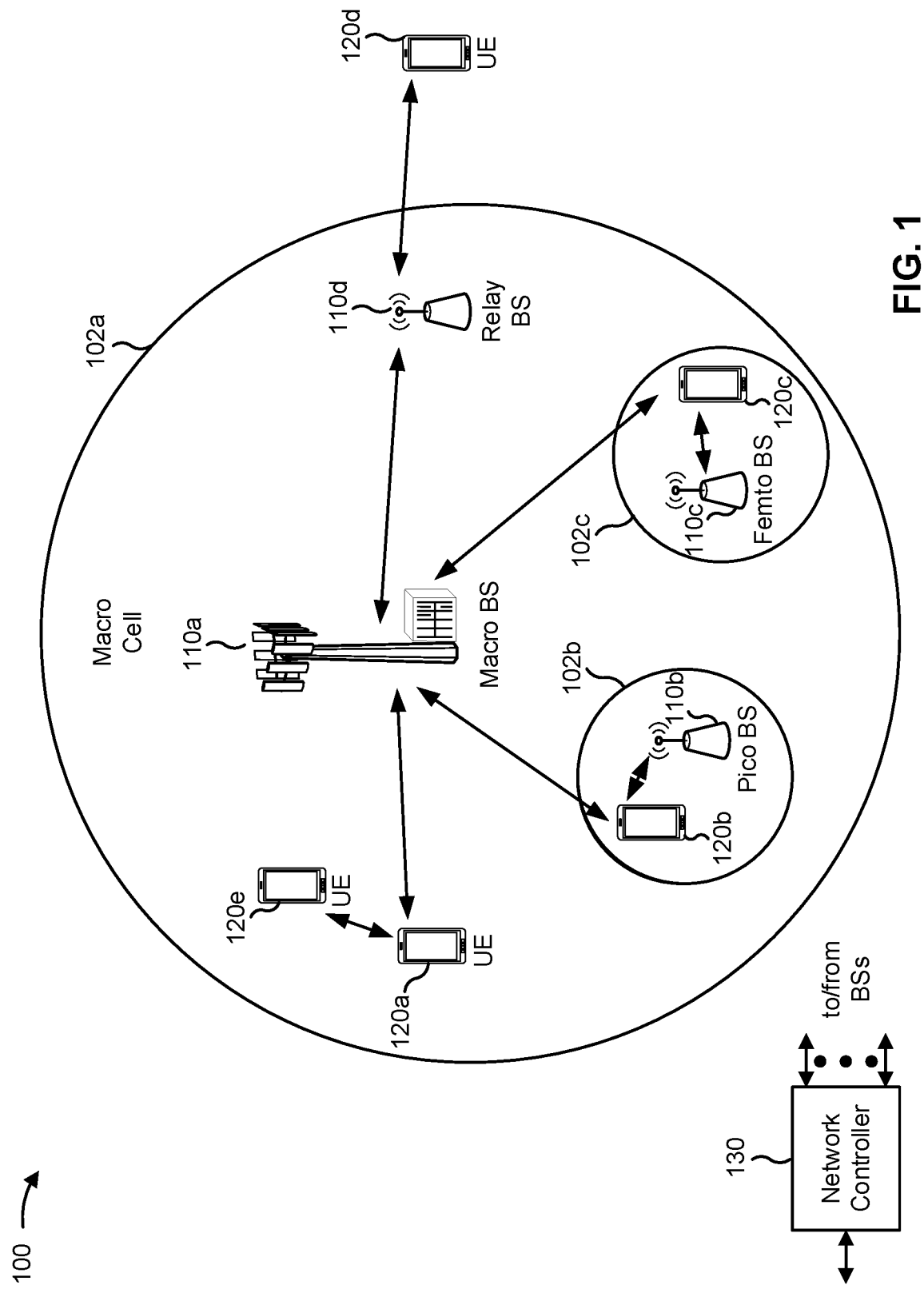
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
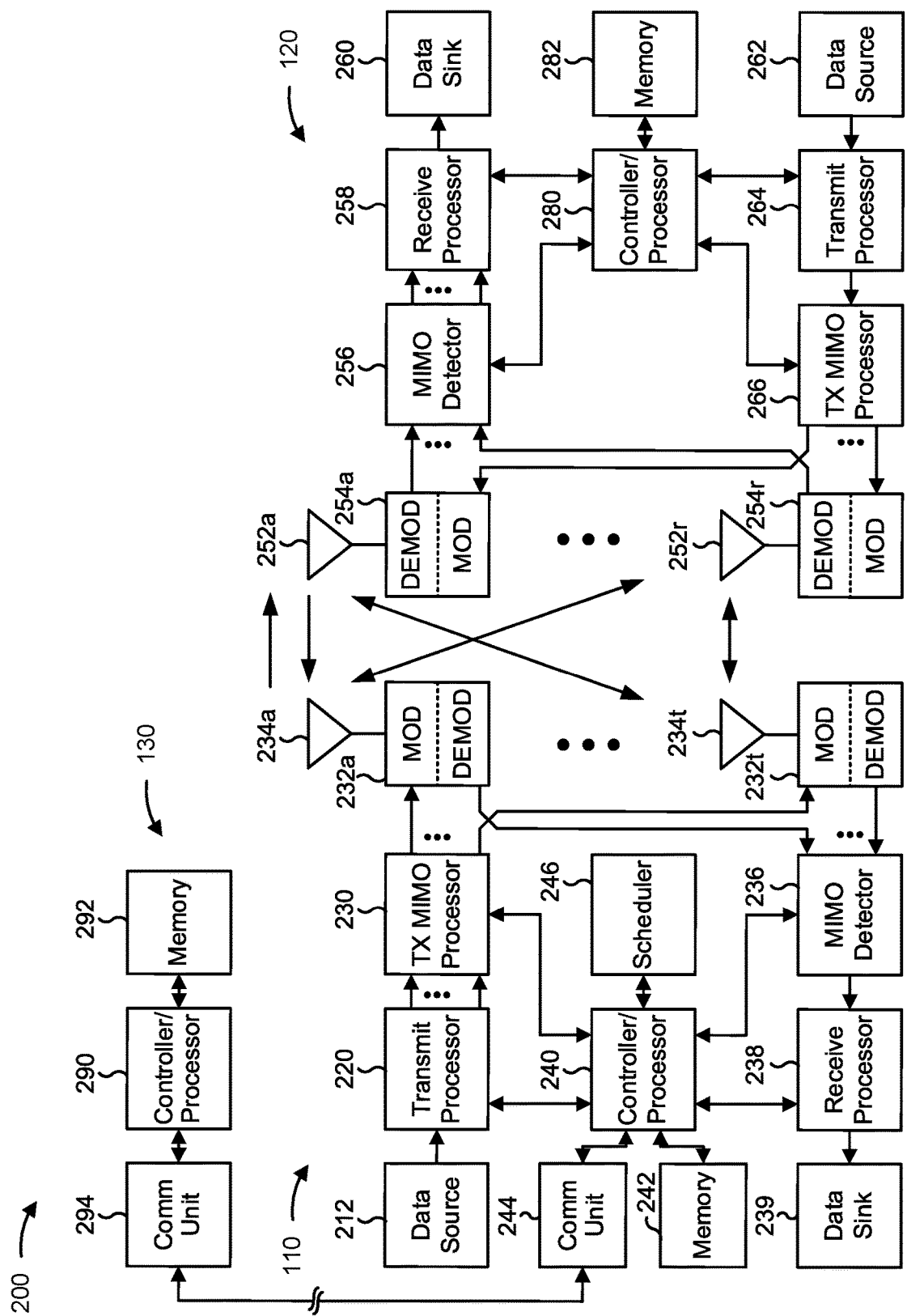
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, wherein general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting a WUS pool for waking up multiple UEs, as described in more detail elsewhere herein. For example, controller/processor 240 of base station 110, controller/processor 280 of UE 120, and/or any other component(s) of FIG. 2 may perform or direct operations of, for example, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, and/or other processes as described herein. A scheduler 246 may schedule UEs for data transmission on the downlink and/or uplink.

In some aspects, UE 120 may include means for monitoring a subset of time resources in a WUS pool, where the WUS pool includes contiguous candidate time resources for receiving a WUS, means for detecting the WUS based at least in part on monitoring the subset of time resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a signaling communication that indicates a WUS pool to monitor for a WUS, where the WUS pool includes contiguous candidate time resources for receiving the WUS, means for transmitting the WUS in the WUS pool, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
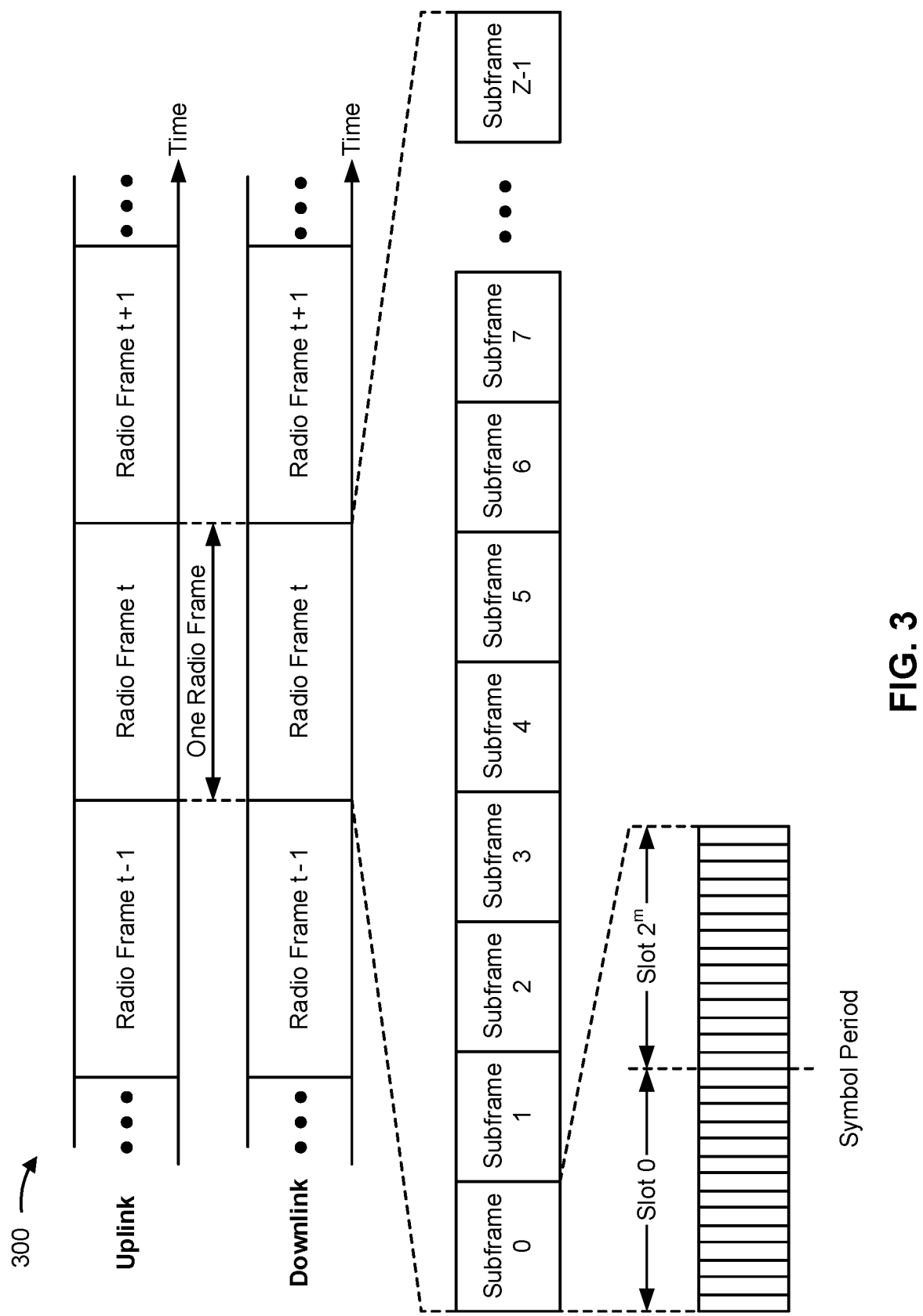
FIG. 3 shows an example frame structure for frequency division duplexing in a telecommunications system.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

As indicated above, FIG. 3 is provided as an example. Other examples may differ from what is described with regard to FIG. 3.

Figure 4:
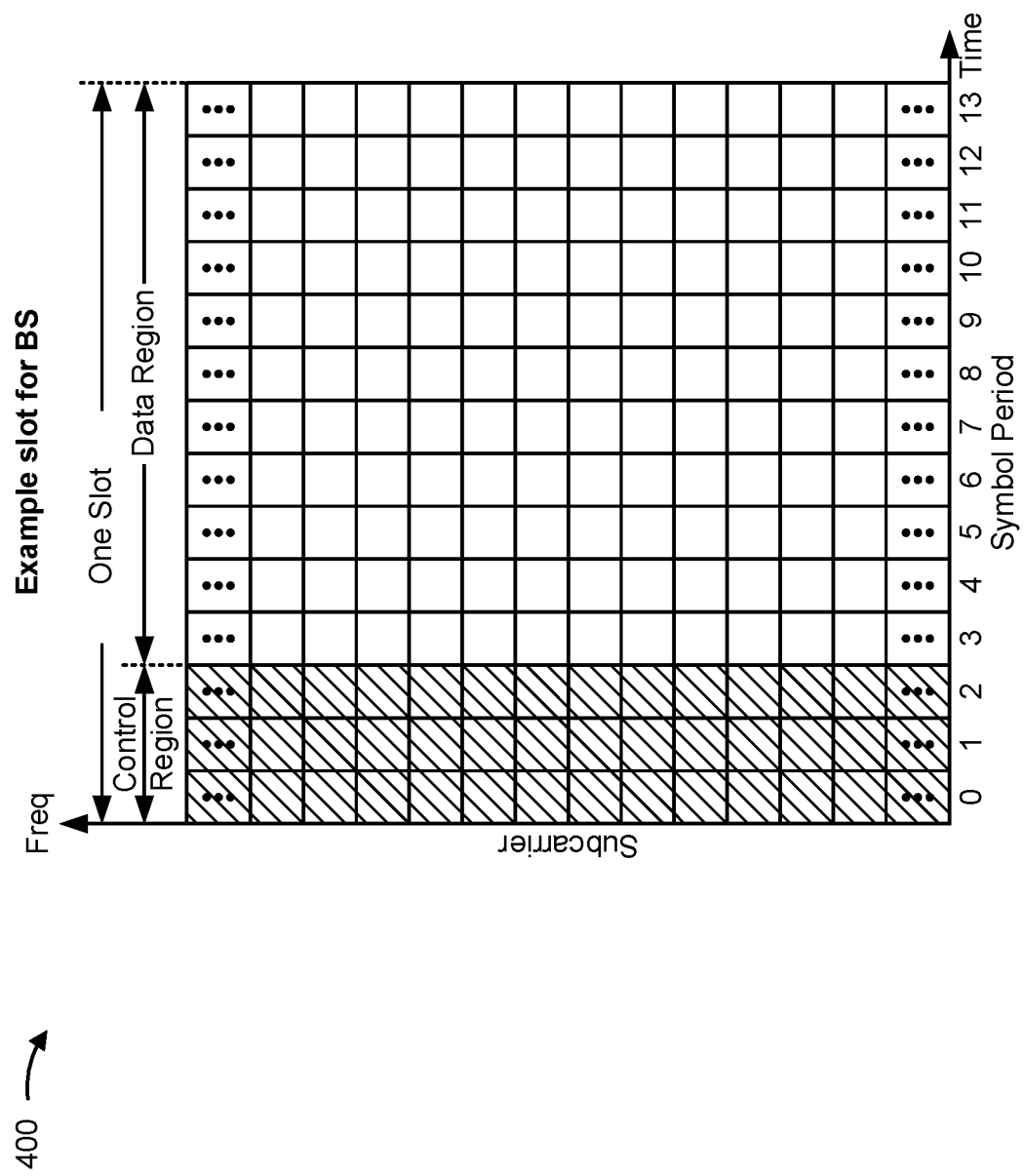
FIG. 4 shows an example slot format with a normal cyclic prefix.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. NR may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a receiver (a UE or another type of wireless communication device that includes a receiver) may operate in various modes, such as an active mode (e.g., a mode where the majority of the modules and/or components of the receiver are active and operating), one or more power-saving modes (e.g., a low-power mode, an idle mode, a sleep mode, a discontinuous reception (DRX) mode), and/or the like. When a receiver is in a power-saving mode, one or more modules and/or components (e.g., a radio frequency receiver, a receiver front end, a baseband processor, a digital signal processor, and/or the like) of the receiver may be disabled and/or deactivated such that the modules and/or components consume fewer processing, memory, radio, and/or battery resources. Thus, the power-saving mode can extend the duration of a single charge of the receiver's battery, which in turn may enhance user experience of the receiver, extend the operating life of the receiver, decrease operational costs of the receiver, and/or decrease hardware costs of the receiver.

Various techniques have been introduced for transitioning a receiver out of a power-saving mode and into an active mode. One technique includes transmitting a signal to a UE, which may indicate that a physical downlink control channel (PDCCH) communication, and/or other communication, is to be transmitted to the UE. The signal may be referred to as a wakeup signal (WUS). The UE may temporarily transition out of the power-saving mode (e.g., by activating one or more modules and/or components, such as the baseband processor and/or the like) to monitor a downlink, between the UE and a BS, for the WUS during a time period. If the UE does not detect the presence of the WUS in the downlink during the time period, the UE may return to the power-saving mode until the UE is to again monitor the downlink for the WUS. If the UE detects the presence of the WUS in the downlink, the UE may transition to the active mode in order to receive the PDCCH communication.

A WUS may be implemented using various types of signals, sequences, transmissions, and/or the like. For example, a WUS may be reference signal-based (e.g., may be implemented by a channel state information reference signal (CSI-RS), a tracking reference signal (TRS), a demodulation reference signal (DMRS), and/or the like), may be PDCCH-based (e.g., may be implemented by a PDCCH communication), may be sequence-based (e.g., may be implemented by a Gold sequence, a Zadoff Chu sequence, and/or the like), and/or the like. A PDCCH WUS may be more robust relative to other types of wakeup signals in that a PDCCH WUS may have built-in coding and cyclic redundancy check (CRC) mechanisms.

To detect a PDCCH WUS, the UE may monitor numerous PDCCH candidate locations configured for the UE, and may perform blind decoding of the PDCCH candidate locations to determine whether the PDCCH WUS is located in any of the PDCCH candidate locations.

A 5G network may transmit a WUS in the two different frequency ranges that are available for 5G wireless communications, known as frequency range 1 (FR1) and frequency range 2 (FR2). FR1 may include a frequency range of 450 MHz to 7.125 GHz that carries traditional cellular communications traffic. FR2 may include a range between 24.25 GHz and 52.6 GHz that provides for short range communications with a very high data rate. A WUS may be used in either FR1 or FR2, but FR2 is under an analog beam restriction and thus the cost of using the WUS is higher in FR2 than for FR1. A base station in 5G (e.g., gNB) may only transmit one beam at a given time in FR2. Although a WUS may be used for multiple UEs, the WUS is UE-specific and the WUS for a UE needs to be transmitted in a beam that the UE is configured to receive (the beam may not be the same beam as for another UE). That is, a WUS for a first UE cannot be transmitted when the base station is serving a second UE in a different beam. The base station needs to interrupt or puncture the second UE to create a gap to tune to a beam of the first UE to send the WUS to the first UE. An interruption of beam communication for the second UE to send the WUS for the first UE complicates operations at the base station and the second UE. Additional signaling for the WUS and puncturing may be needed for the second UE. To send the WUS to more UEs may require even more interruptions of beam communications for multiple UEs. As a result, a performance of communications may suffer due to the multiple interruptions. The base station and affected UEs may increase consumption of power, processing, and/or signaling resources while switching beams and accounting for the multiple interruptions.

Some aspects described herein provide techniques and apparatuses for pooling WUSs for multiple UEs into a WUS pool. The WUS pool may include a plurality of contiguous candidate time resources for receiving a WUS. A base station may determine, for each UE of the multiple UEs, a subset of candidate time resources in the WUS pool and select WUS time resources from the subset for each UE. The base station may transmit the WUS in the WUS time resources. Each UE may monitor the respective subset of candidate time resources for the UE in the WUS pool. Each UE may wake up based at least in part on detecting the WUS, which includes a WUS that is specific to the respective UE. The WUS pool may be periodically transmitted during a scheduled duration for the WUS pool, such as before a discontinuous reception mode for the multiple UEs. In this way, the interruptions are eliminated. Without the multiple interruptions and beam switches, the base station and affected UEs may decrease consumption of power, processing, and signaling resources that would otherwise be spent on the beam interruptions.

Figure 5A:
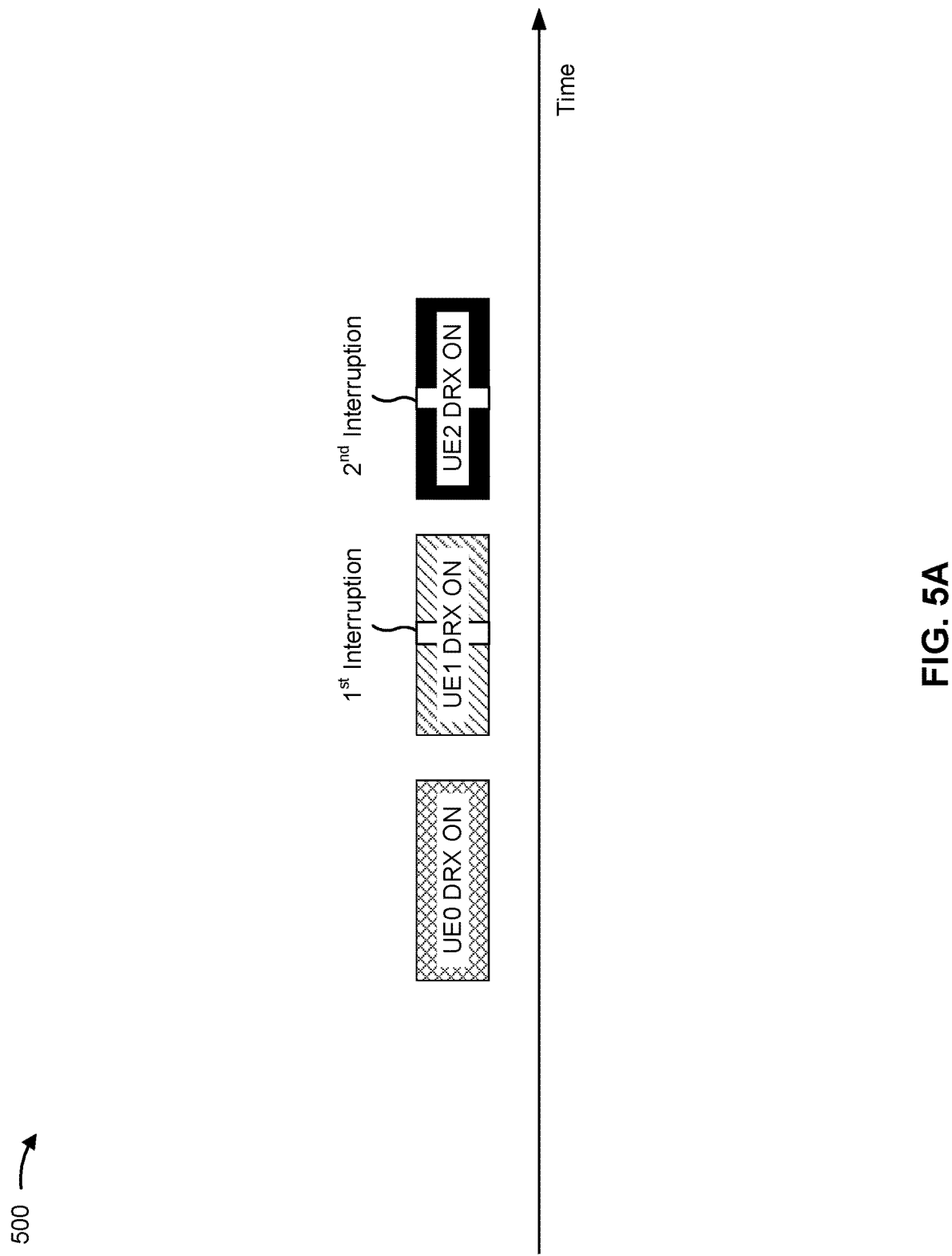
FIG. 5A illustrates an example of multiple interruptions of beam communications for a WUS.

FIG. 5A illustrates an example 500 of multiple interruptions of beam communications for a WUS.

In FR2, a base station cannot transmit a WUS for a first UE (UE0) on a beam when the base station is serving a second UE (UE1) in a different beam. The base station needs to interrupt the beam for UE1 to create a gap to tune to the beam of UE0 to send the WUS to UE0. If the base station needs to interrupt a beam for UE2 to create a gap to tune to the beam of UE0 or UE1, to send the WUS to UE0 or UE1, this may involve an additional interruption. As a result of multiple interruptions, a performance of communications may suffer. The base station, UE1, and UE2 may increase consumption of power, processing, and/or signaling resources switching beams for the multiple interruptions.

As indicated above, FIG. 5A is provided as an example. Other examples may differ from what is described with regard to FIG. 5A.

Figure 5B:
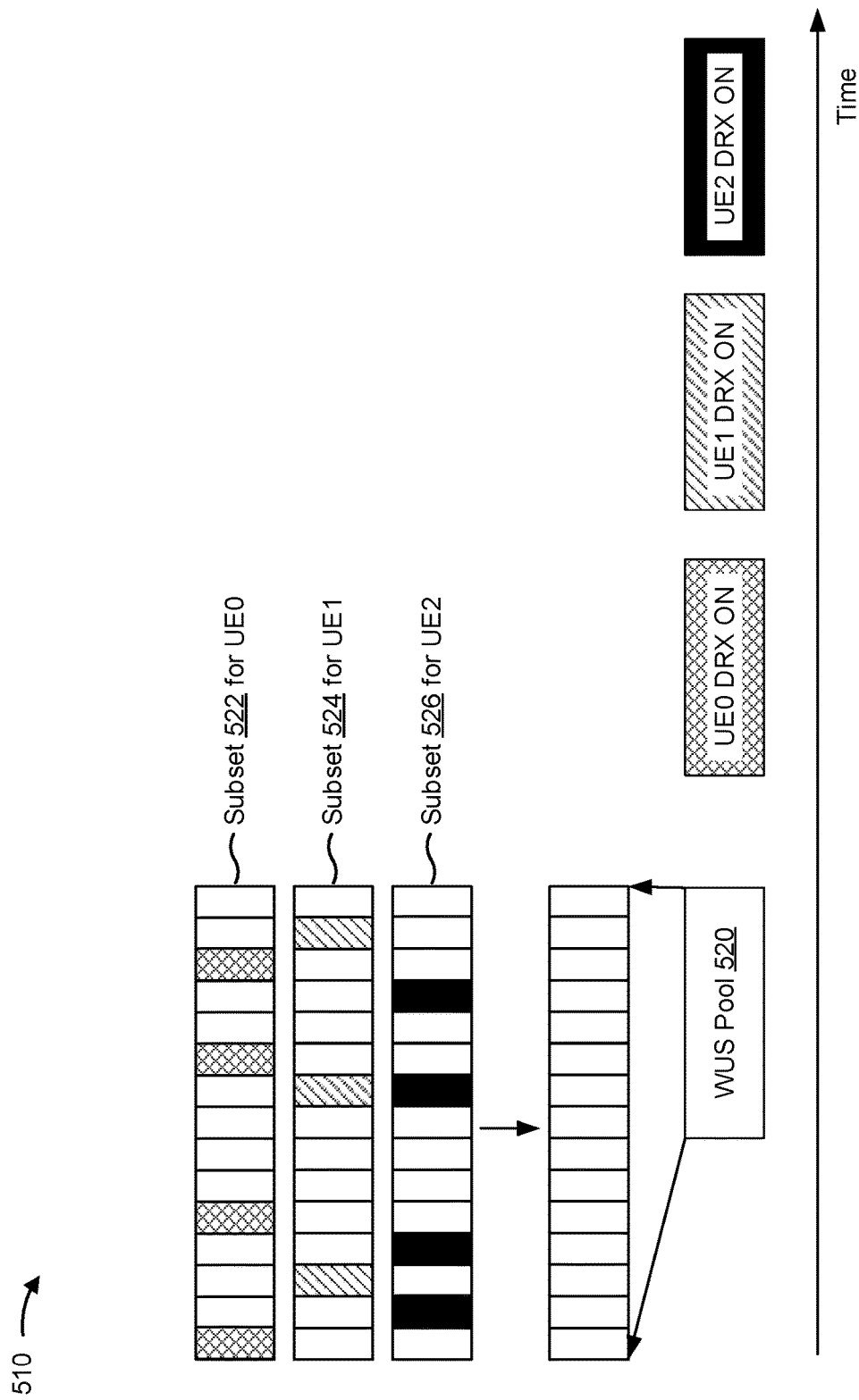
FIG. 5B illustrates an example of a wake up signal (WUS) pool for waking up multiple UEs, in accordance with various aspects of the present disclosure.

FIG. 5B illustrates an example 510 of a WUS pool for waking up multiple UEs, in accordance with various aspects of the present disclosure. A base station (e.g., BS 110) may transmit the WUS pool to one or more UEs (e.g., UE 120).

A WUS pool 520 may include contiguous candidate time resources. The time resources may be mini-slots, symbols, and/or the like. WUS pool 520 may include a WUS (or multiple WUSs) that wakes up UE0, UE1, and UE2. The base station may determine a subset of time resources that are distributed within WUS pool 520 for each UE. For example, the base station may determine subset 522 for UE0, subset 524 for UE1, and subset 526 for UE2, based at least in part on a distribution function for distributing time resources within WUS pool 520. The distribution function may be a hash function. The hash function may randomize positions within WUS pool 520 based on information such as a UE identifier (e.g., cell radio network temporary identifier (C-RNTI)). The distribution function may also follow a pattern that may be based at least in part on how many UEs will receive a WUS.

As shown in FIG. 5B, there may be no interruption of a beam for UE1. The base station may transmit WUS pool 520 during a scheduled WUS pool duration for WUS pool 520. For example, the base station may transmit WUS pool 520 periodically before a discontinuous reception mode on (DRX ON) duration for UE0, UE1 and UE2. In some aspects, there may be only a single interruption.

As indicated above, FIG. 5B is provided as an example. Other examples may differ from what is described with regard to FIG. 5B.

Figure 6:
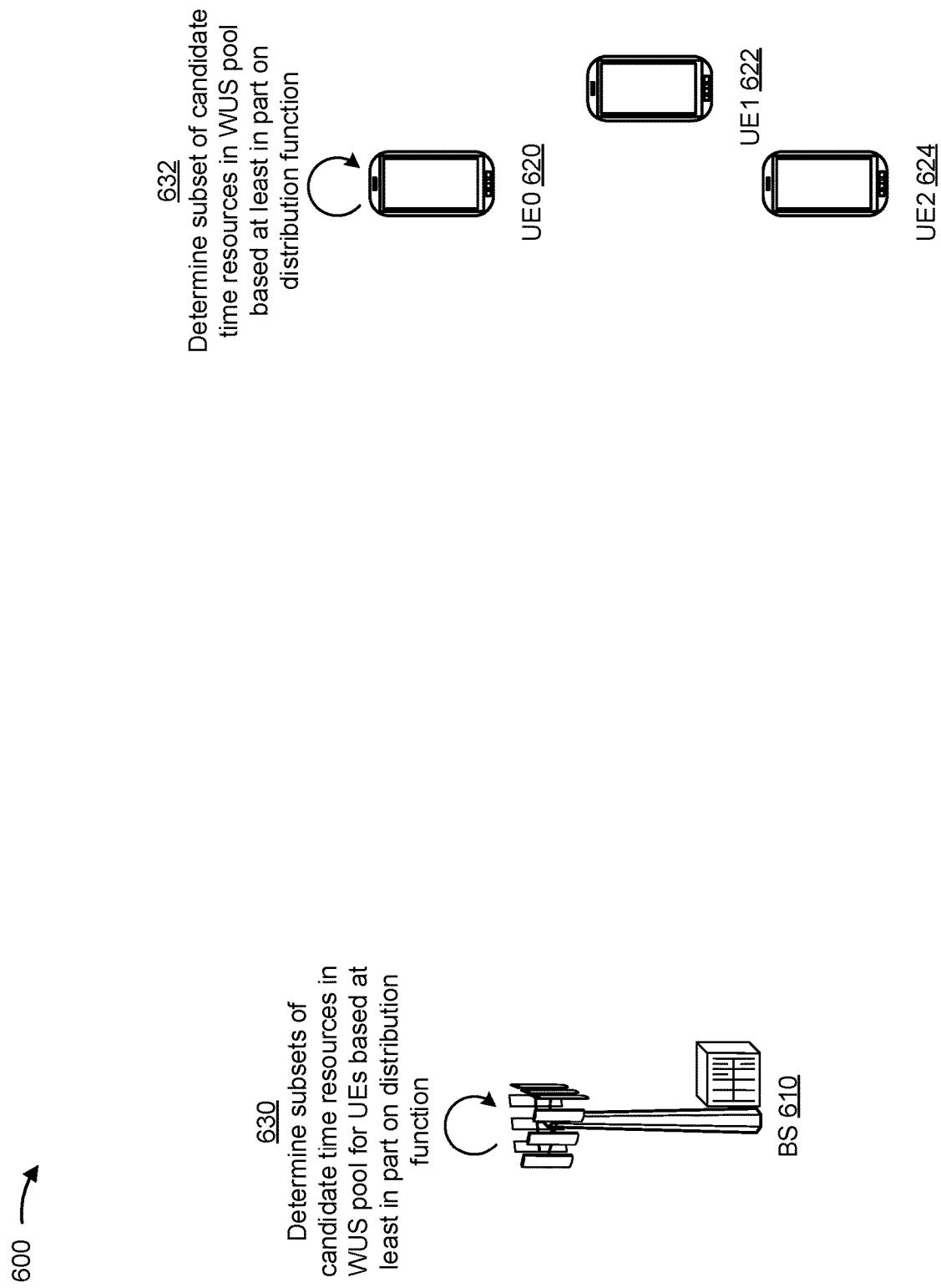
FIG. 6 illustrates an example of transmitting a WUS pool for waking up multiple UEs, in accordance with various aspects of the present disclosure.

FIG. 6 illustrates an example 600 of transmitting a WUS pool for waking up multiple UEs, in accordance with various aspects of the present disclosure. FIG. 6 illustrates a base station 610 (e.g., base station 110) that may transmit the WUS pool to multiple UEs (e.g., UE 120) such as UE0 620, UE1 622, and UE2 624.

As shown by reference number 630, base station 610 may determine subsets of candidate time resources in the WUS pool for UEs based at least in part on a distribution function. Base station 610 may transmit a configuration for the WUS pool to multiple UEs via radio resource control (RRC) signaling. Base station 610 may also transmit one or more distribution functions and/or information for implementing the one or more distribution functions to the multiple UEs. As shown by reference number 632, the multiple UEs may also be configured to determine a subset of candidate time resources in a WUS pool based at least in part on the one or more distribution functions. That is, base station 610 and the multiple UEs may be configured to separately determine a subset for each UE in a WUS pool. Consequently, if base station 610 determines a subset for each UE and transmits a WUS in subsets for the multiple UEs in a WUS pool, each UE may monitor the same respective subset for the respective UE to detect the WUS.

For example, base station 610 and UE0 620 may separately determine a subset of candidate time resources within a WUS pool configuration based at least in part on a UE identifier (e.g., C-RNTI) of UE0 620 and a same distribution function. Base station 610 may have identified the UE identifier for UE0 620. As a result, base station 610 may transmit a WUS in the subset that base station 610 determined, and UE1 620 may monitor and detect the WUS in the subset that UE1 620 determined. As the subset that base station 610 determined and the subset that UE1 620 determined is a same subset, UE1 620 may successfully detect the WUS.

In some aspects, base station 610 may configure a different number of WUS occasions for different UEs based at least in part on a decoding capability of the UEs and/or a UE category (representing a class of UE or a capability of a UE). Base station 610 may configure a large number of time resources for UEs with a low decoding latency or a high category. For example, with less time for decoding, time resources of a subset may be closer together and/or greater in quantity in a subset. In some aspects, base station 610 may randomize time resources differently for different UEs to avoid time resource collisions. In some aspects, positions of time resources for a WUS may be a function of a cell ID and/or a time slot index.

In some aspects, base station 610 may consider N time resources in a WUS pool and a UE may be configured to monitor K time resources. When K=N, the UE can be woken up by a WUS in any one of the N time resources. This may be considered a highest requirement on UE monitoring capability. When N>K in general, a hashing function may be random (randomly distribute K time resources out of N time resources). A hashing function may be UE specific. A hashing function may be randomized over time per cell.

As indicated above, FIG. 6 is provided as an example. Other examples may differ from what is described with regard to FIG. 6.

Figure 7:
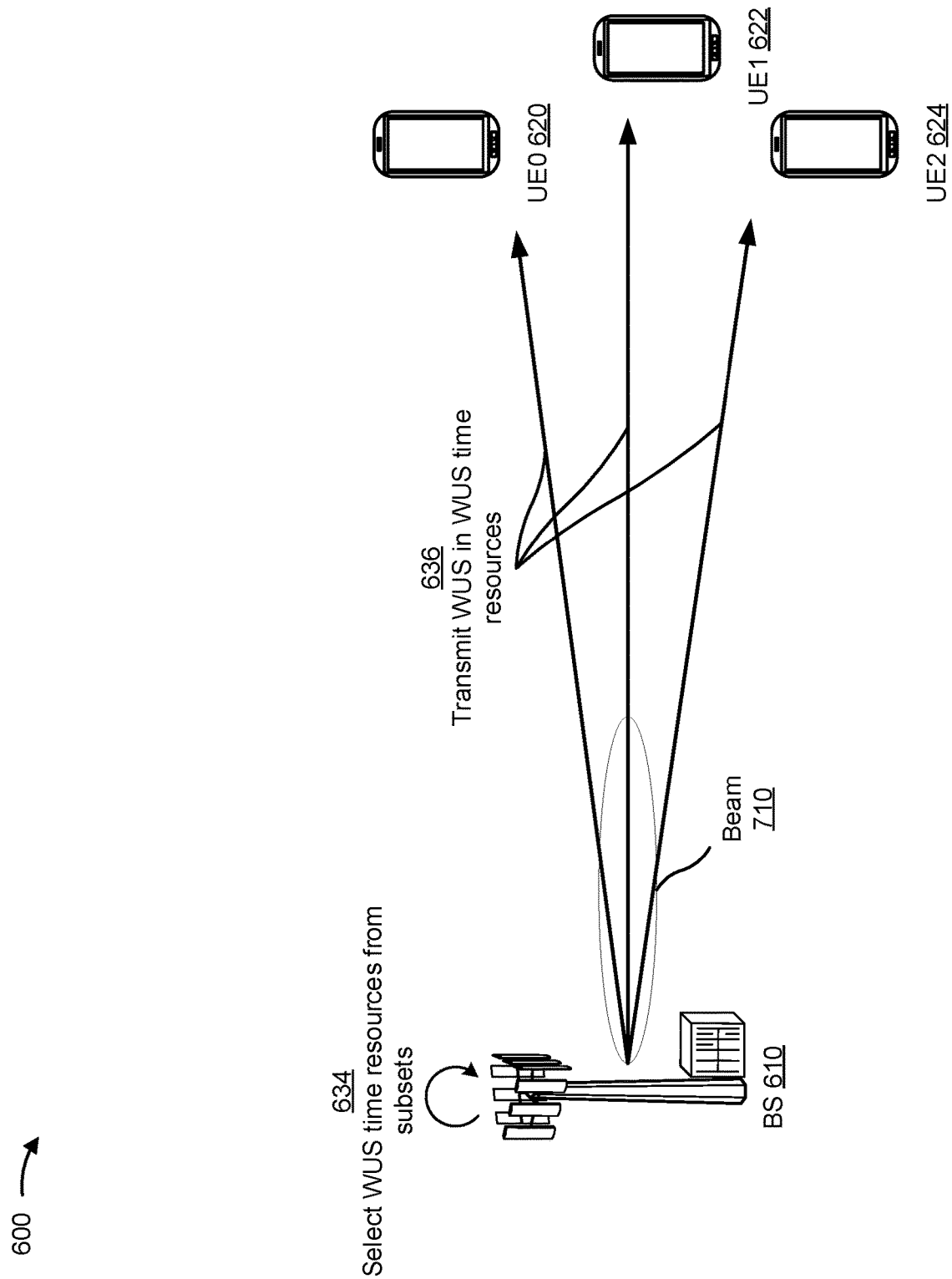
FIG. 7 illustrates an example of transmitting a WUS pool for waking up multiple UEs, in accordance with various aspects of the present disclosure.

FIG. 7 illustrates example 600 of transmitting a WUS pool for waking up multiple UEs, in accordance with various aspects of the present disclosure. FIG. 7 illustrates base station 610 transmitting the WUS pool to multiple UEs such as UE0 620, UE1 622, and UE2 624.

As shown by reference number 634, base station 610 may select WUS time resources from the subsets determined for the multiple UEs. As shown by reference number 636, base station 610 may transmit a WUS in the WUS time resources. In some aspects, multiple UEs selected for a WUS pool may communicate with base station 610 with a same beam 710. For example, base station 610 may use beam 710 for each of UE0 620, UE1 622, and UE2 624, and thus UE0 620, UE1 622, and UE2 624 may be part of a same WUS pool.

As indicated above, FIG. 7 is provided as an example. Other examples may differ from what is described with regard to FIG. 7.

Figure 8:
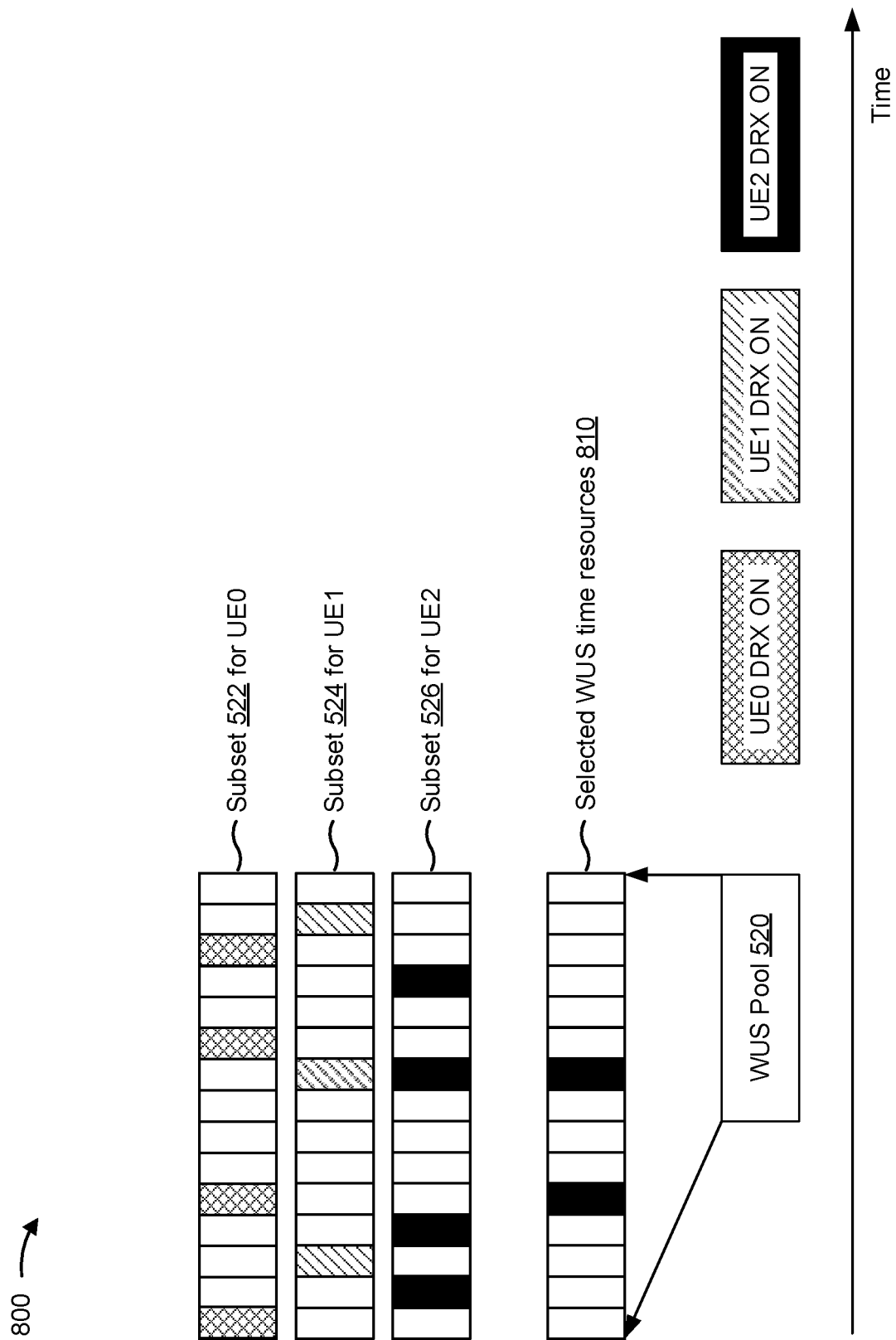
FIG. 8 illustrates an example of WUS time resources selected from subsets, in accordance with various aspects of the present invention.

FIG. 8 illustrates an example 800 of WUS time resources selected from subsets of candidate time resources, in accordance with various aspects of the present invention. A base station (e.g., BS 610) may transmit the WUS pool to one or more UEs (e.g., UE0 620, UE1 622, or UE2 624).

As shown by reference number 810, base station 610 may select WUS time resources from subsets 522-526 in order to place the WUS signal. In some aspects, base station 610 may select, as the WUS time resources, time resources of subsets that overlap or are adjacent to time resources of other subsets. For example, base station 610 may select a time resource in subset 524, that overlaps a time resource in subset 526, to be a WUS time resource. Base station 610 may select a time resource of subset 522 that is adjacent to a time resource of subset 526. Base station 610 may transmit the WUS in the WUS time resources of WUS pool 520.

As indicated above, FIG. 8 is provided as an example. Other examples may differ from what is described with regard to FIG. 8.

Figure 9:
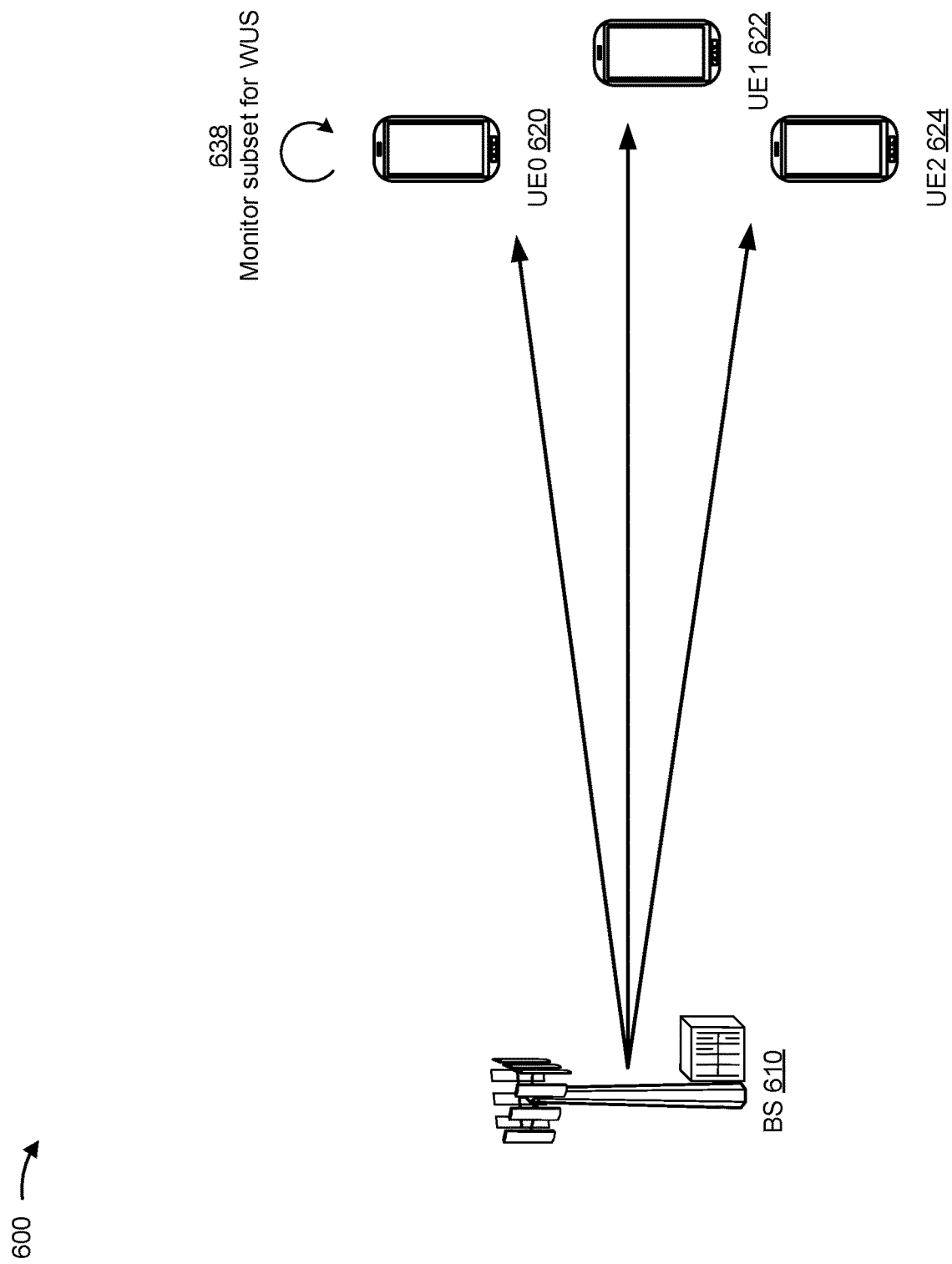
FIG. 9 illustrates an example of transmitting a WUS pool for waking up multiple UEs, in accordance with various aspects of the present disclosure.

FIG. 9 illustrates example 600 of transmitting a WUS pool for waking up multiple UEs, in accordance with various aspects of the present disclosure. FIG. 9 illustrates base station 610 transmitting the WUS pool to multiple UEs such as UE0 620, UE1 622, and UE2 624.

As shown by reference number 638, UE0 620, as well as UE1 622 and UE2 624, may monitor the respective subset of the respective UE for a WUS. In some aspects, UE0 620 may monitor more than a first 3 symbols of a resource block that is a physical downlink control channel (PDCCH). A WUS pool may involve time resources spread beyond the PDCCH, such as into the physical downlink shared channel (PDSCH).

As indicated above, FIG. 9 is provided as an example. Other examples may differ from what is described with regard to FIG. 9.

Figure 10:
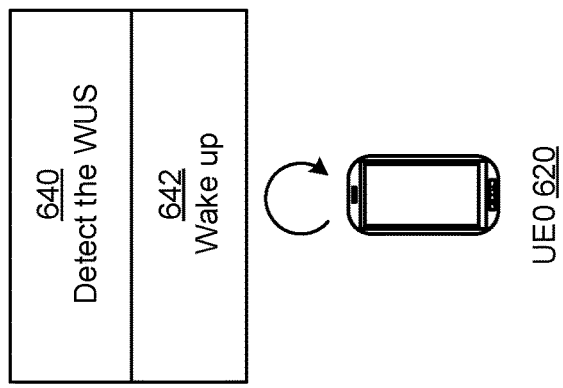
FIG. 10 illustrates an example of transmitting a WUS pool for waking up multiple UEs, in accordance with various aspects of the present disclosure.
Figure 10:
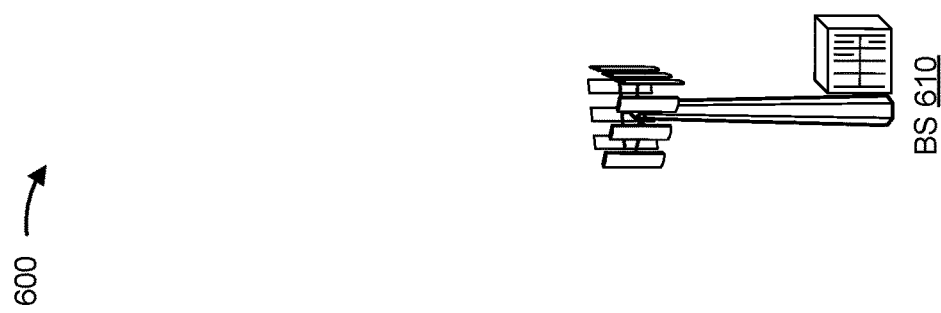

FIG. 10 illustrates example 600 of transmitting a WUS pool for waking up multiple UEs, in accordance with various aspects of the present disclosure. FIG. 10 illustrates a UE, such as UE0 620, detecting the WUS and waking up.

As shown by reference number 640, UE0 620 (as well as UE1 622 and UE2 624) may detect the WUS in a monitored subset of UE0 620. As shown by reference number 642, UE0 620 may wake up.

As indicated above, FIG. 10 is provided as an example. Other examples may differ from what is described with regard to FIG. 10.

Figure 11:
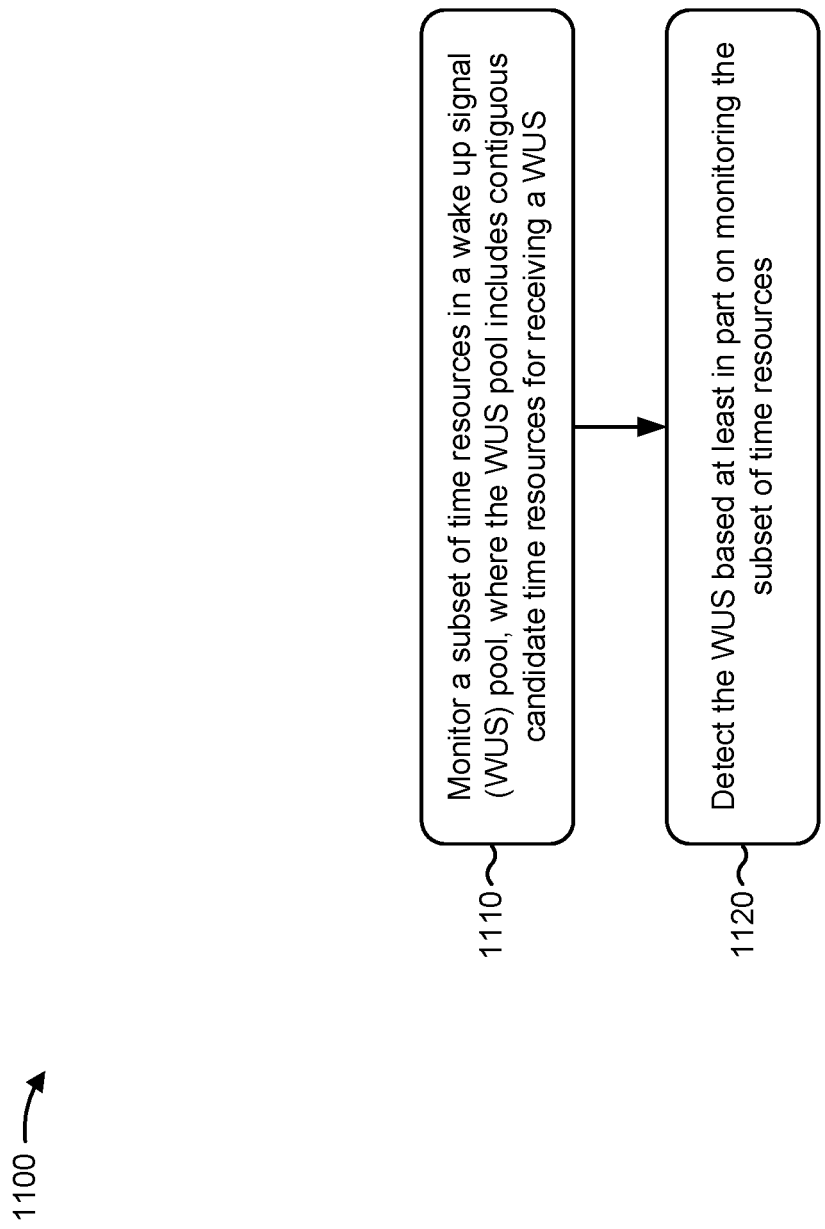
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120, UE 520, and/or the like) performs operations associated with receiving a wake up signal (WUS) pool for waking up multiple UEs.

As shown in FIG. 11, in some aspects, process 1100 may include monitoring a subset of time resources in a WUS pool, wherein the WUS pool includes contiguous candidate time resources for receiving a WUS (block 1110). For example, the UE (e.g., using receive processor 258, transmit processor 264, controller/processor 280, memory 282, and/or the like) may monitor a subset of time resources in a WUS pool, as described above in connection with FIGS. 5A-10. In some aspects, the WUS pool includes contiguous candidate time resources for receiving a WUS.

As further shown in FIG. 11, in some aspects, process 1100 may include detecting the WUS based at least in part on monitoring the subset of time resources (block 1120). For example, the UE (e.g., using receive processor 258, transmit processor 264, controller/processor 280, memory 282, and/or the like) may detect the WUS based at least in part on monitoring the subset of time resources, as described above in connection with FIGS. 5A-10.

Process 1100 may include additional aspects, such as any single aspect or any combination of aspects described below and/or in connection with one or more other processes described elsewhere herein.

In a first aspect, process 1100 further comprises determining the subset of time resources based at least in part on a distribution function for distributing time resources within the WUS pool.

In a second aspect, alone or in combination with the first aspect, the distribution function is a hash function for randomizing time resource positions of the subset in the WUS pool.

In a third aspect, alone or in combination with one or more of the first and second aspects, determining the subset includes determining the subset based at least in part on an identifier of the UE and the distribution function.

In a fourth aspect, alone or in combination with one or more of the first through third aspects, the distribution function is a function for distributing time resource positions of the subset in a pattern in the WUS pool.

In a fifth aspect, alone or in combination with one or more of the first through fourth aspects, determining the subset includes determining the subset based at least in part on one or more of a decoding capability of the UE, a category of the UE, a cell identifier, or a time slot index.

In a sixth aspect, alone or in combination with one or more of the first through fifth aspects, monitoring the subset includes monitoring a frequency above 24 GHz.

In a seventh aspect, alone or in combination with one or more of the first through sixth aspects, monitoring the subset includes monitoring more than a first 3 symbols of a resource block.

In an eighth aspect, alone or in combination with one or more of the first through seventh aspects, monitoring the subset includes monitoring a physical downlink shared channel.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
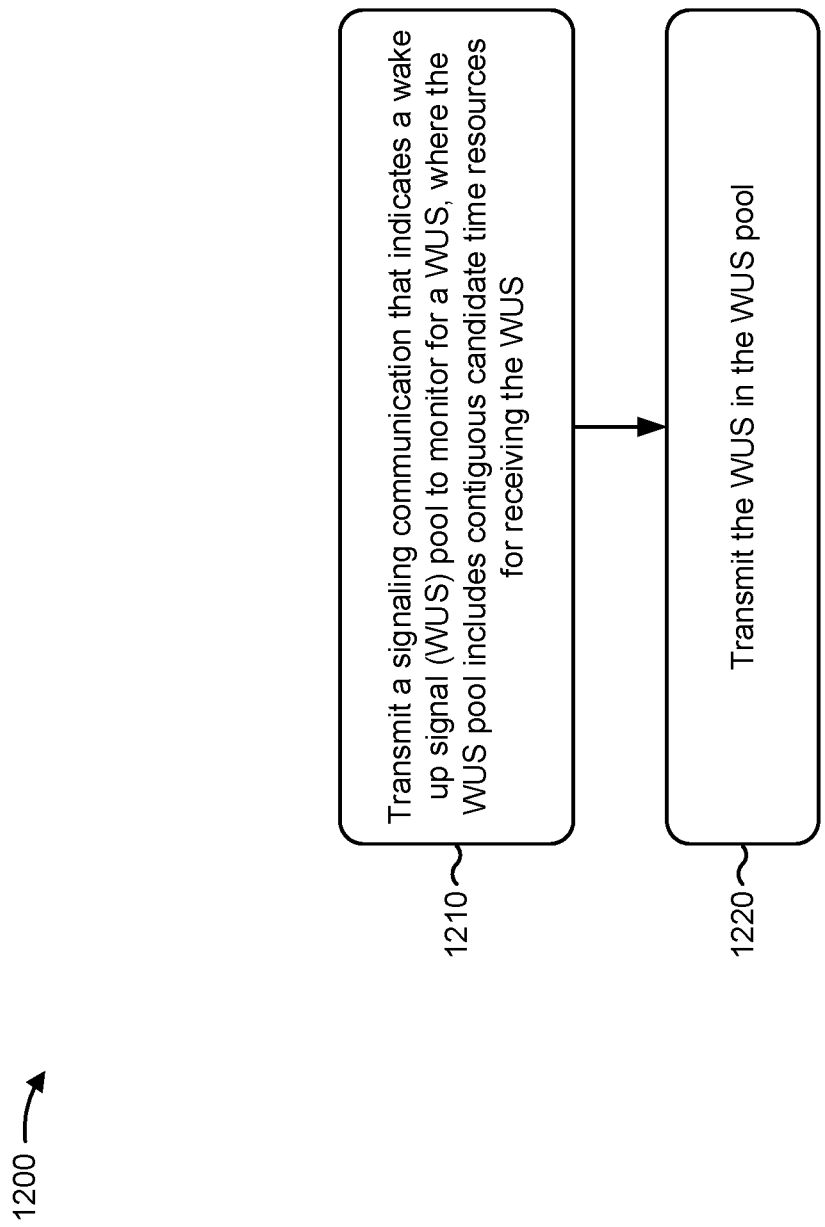
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where a base station (e.g., base station 110, base station 510, and/or the like) performs operations associated with transmitting a WUS pool for waking up multiple UEs.

As shown in FIG. 12, in some aspects, process 1200 may include transmitting a signaling communication that indicates a WUS pool to monitor for a WUS, where the WUS pool includes contiguous candidate time resources for receiving the WUS (block 1210). For example, the base station (e.g., using receive processor 238, transmit processor 220, controller/processor 240, memory 242, and/or the like) may transmit a signaling communication that indicates a WUS pool to monitor for a WUS, as described above in connection with FIGS. 5A-10. In some aspects, the WUS pool includes contiguous candidate time resources for receiving the WUS.

As further shown in FIG. 12, in some aspects, process 1200 may include transmitting the WUS in the WUS pool (block 1220). For example, the base station (e.g., using receive processor 238, transmit processor 220, controller/ processor 240, memory 242, and/or the like) may transmit the WUS in the WUS pool, as described above in connection with FIGS. 5A-10.

Process 1200 may include additional aspects, such as any single aspect or any combination of aspects described below and/or in connection with one or more other processes described elsewhere herein.

In a first aspect, the WUS pool is shared by a plurality of UEs.

In a second aspect, alone or in combination with the first aspect, the plurality of UEs are associated with a same receiving beam.

In a third aspect, alone or in combination with one or more of the first and second aspects, process 1200 further comprises determining, for each UE of the plurality of UEs, a respective subset of time resources in the WUS pool, based at least in part on a distribution function for distributing time resources within the WUS pool, and transmitting the WUS in the WUS pool includes transmitting the WUS within the subsets.

In a fourth aspect, alone or in combination with one or more of the first through third aspects, the distribution function is a hash function for randomizing time resource positions of the respective subset in the WUS pool.

In a fifth aspect, alone or in combination with one or more of the first through fourth aspects, determining the respective subset for each UE of the plurality of UEs includes determining the respective subset based at least in part on an identifier of the respective UE and the distribution function.

In a sixth aspect, alone or in combination with one or more of the first through fifth aspects, the distribution function is a function for distributing time resource positions of the respective subset in a pattern in the WUS pool. In some aspects, the pattern is based at least in part on a quantity of the plurality of UEs.

In a seventh aspect, alone or in combination with one or more of the first through sixth aspects, determining the respective subset for each UE includes determining the respective subset based at least in part on one or more of a decoding capability of the respective UE, a category of the respective UE, a cell identifier associated with a serving cell of the plurality of UEs, or a time slot index.

In an eighth aspect, alone or in combination with one or more of the first through seventh aspects, process 1200 further comprises selecting one or more WUS time resources from the subsets and transmitting the WUS to the plurality of UEs on the one or more WUS time resources.

In a ninth aspect, alone or in combination with one or more of the first through eighth aspects, selecting the one or more WUS time resources from the subsets includes selecting a WUS time resource of a subset that overlaps or is adjacent to a WUS time resource of another subset.

In a tenth aspect, alone or in combination with one or more of the first through ninth aspects, process 1200 further comprises transmitting the WUS on a frequency above 24 GHz.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
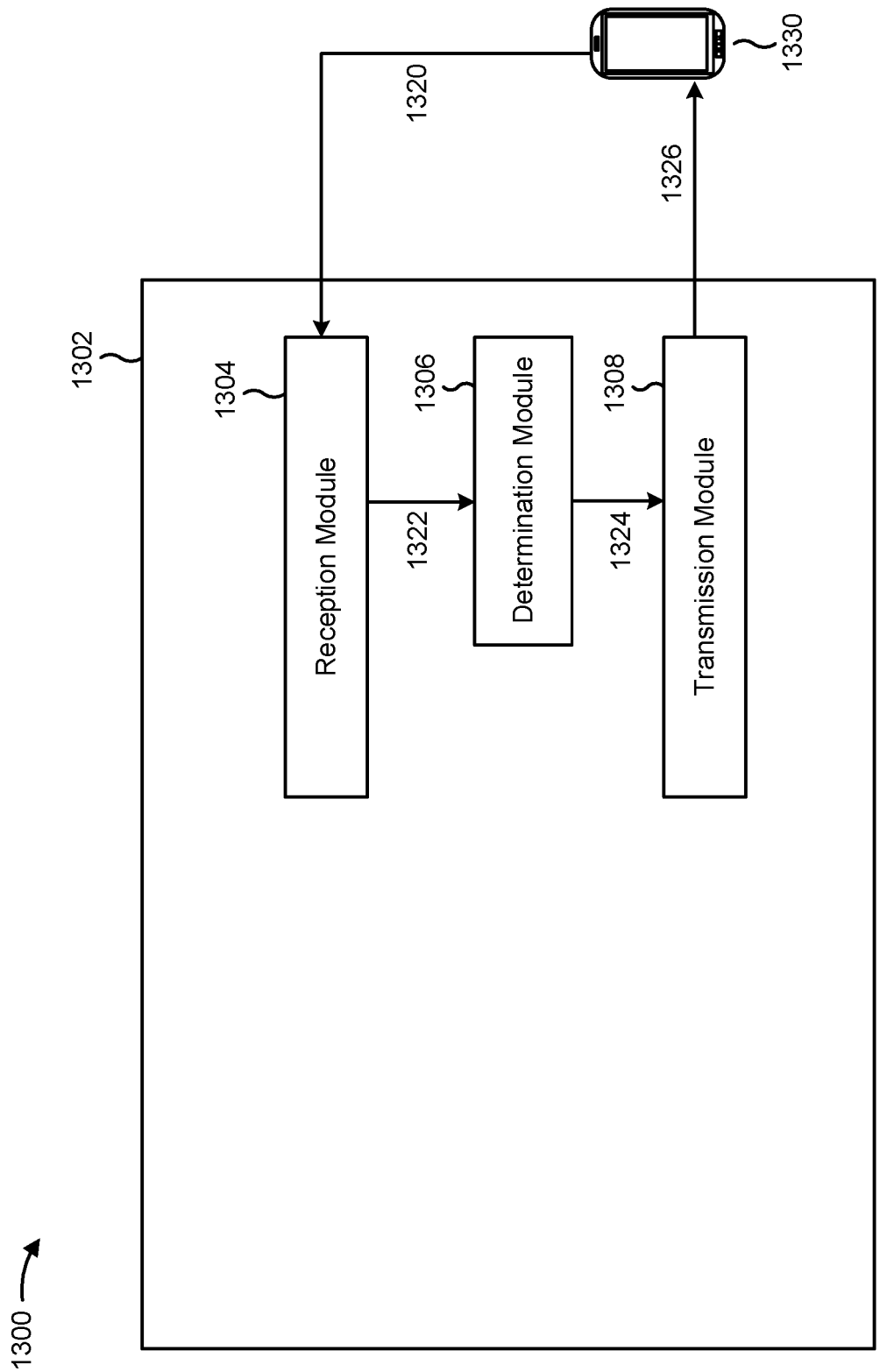
FIG. 13 is a conceptual data flow diagram illustrating data flow between different modules/means/components in an example apparatus.

FIG. 13 is a conceptual data flow diagram 1300 illustrating data flow between different modules/means/components in an example apparatus 1302. The apparatus 1302 may be a BS (e.g., BS 110, BS 510, and/or the like). In some aspects, the apparatus 1302 includes a reception module 1304, a determination module 1306, and/or a transmission module 1308.

Reception module 1304 may receive data 1320 from UE 1330 and transmit data 1322 to determination module 1306.

In some aspects, determination module 1306 may determine, for each UE of a plurality of UEs, a respective subset of time resources in a WUS pool, based at least in part on a distribution function for distributing time resources within the WUS pool. The WUS pool may include contiguous candidate time resources for each UE to receive a WUS. Transmission module 1308 may receive the WUS pool as data 1324. Transmission module 1308 may transmit, as data 1326, a signaling communication that indicates the WUS pool to monitor for the WUS. Transmission module 1308 may transmit, as data 1326, the WUS in the WUS pool. The WUS may be transmitted within the subsets of the WUS pool.

The apparatus may include additional modules that perform each of the blocks of the algorithm in the aforementioned method 1200 of FIG. 12 and/or the like. Each block in the aforementioned method 1200 of FIG. 12 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
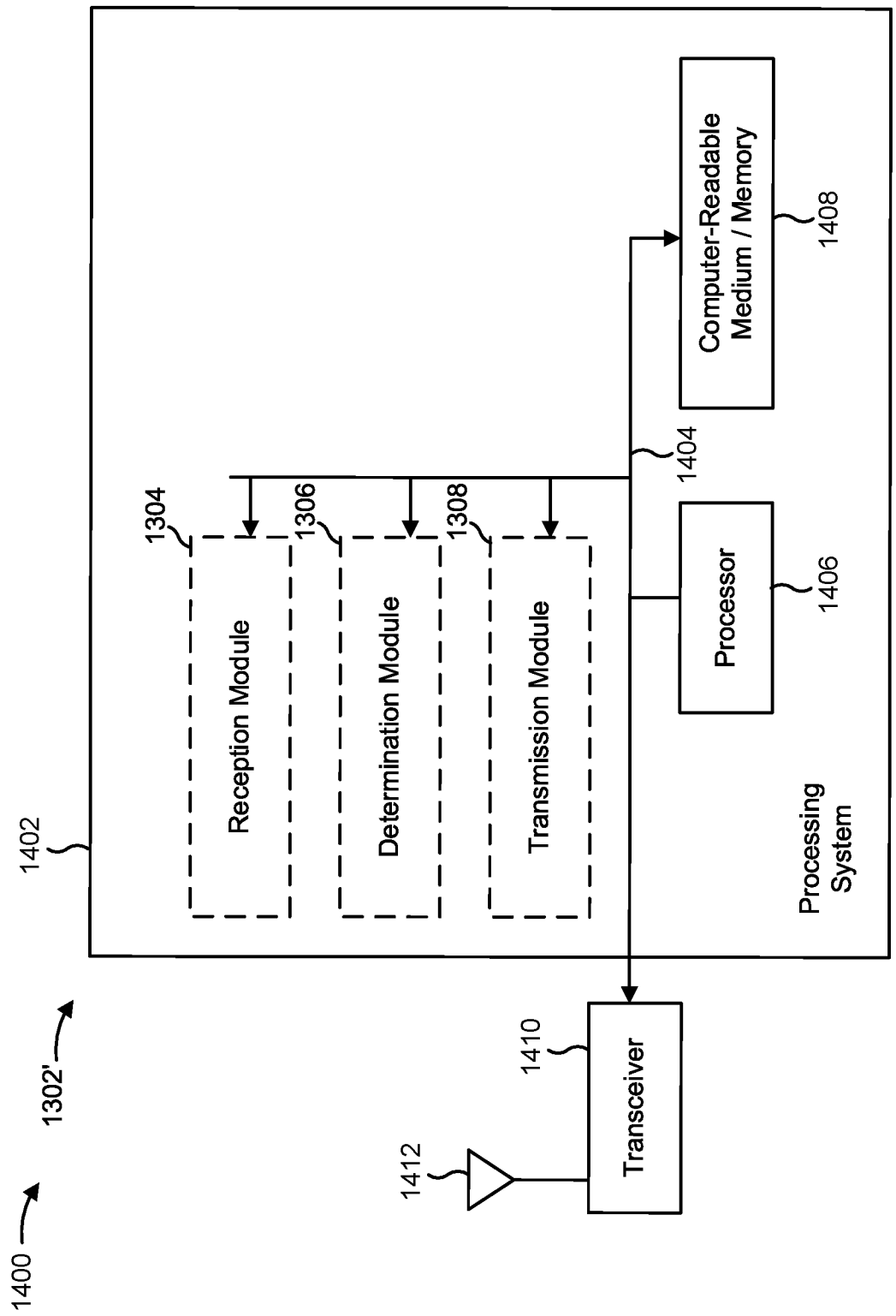
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a BS.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore will not be described any further.

The processing system 1402 may be coupled to a transceiver 1410. The transceiver 1410 is coupled to one or more antennas 1412. The transceiver 1410 provides a means for communicating with various other apparatuses over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described herein for any particular apparatus. The computer-readable medium/memory 1408 may also be used for storing data that is manipulated by the processor 1406 when executing software. The processing system further includes at least module 1306. The modules may be software modules running in the processor 1406, resident/stored in the computer readable medium/memory 1408, one or more hardware modules coupled to the processor 1406, or a combination thereof. The processing system 1402 may be a component of the eNB or gNB 110 and may include the memory 242 and/or at least one of the TX MIMO processor 230, the RX processor 238, and/or the controller/processor 240.

In some aspects, the apparatus 1402/1302' for wireless communication includes means for transmitting a signaling communication that indicates a WUS pool to monitor for a WUS, where the WUS pool includes contiguous candidate time resources for receiving the WUS, and means for transmitting the WUS in the WUS pool. The aforementioned means may be one or more of the aforementioned modules of the apparatus 1302 and/or the processing system 1402 of the apparatus 1302' configured to perform the functions recited by the aforementioned means. As described elsewhere herein, the processing system 1402 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
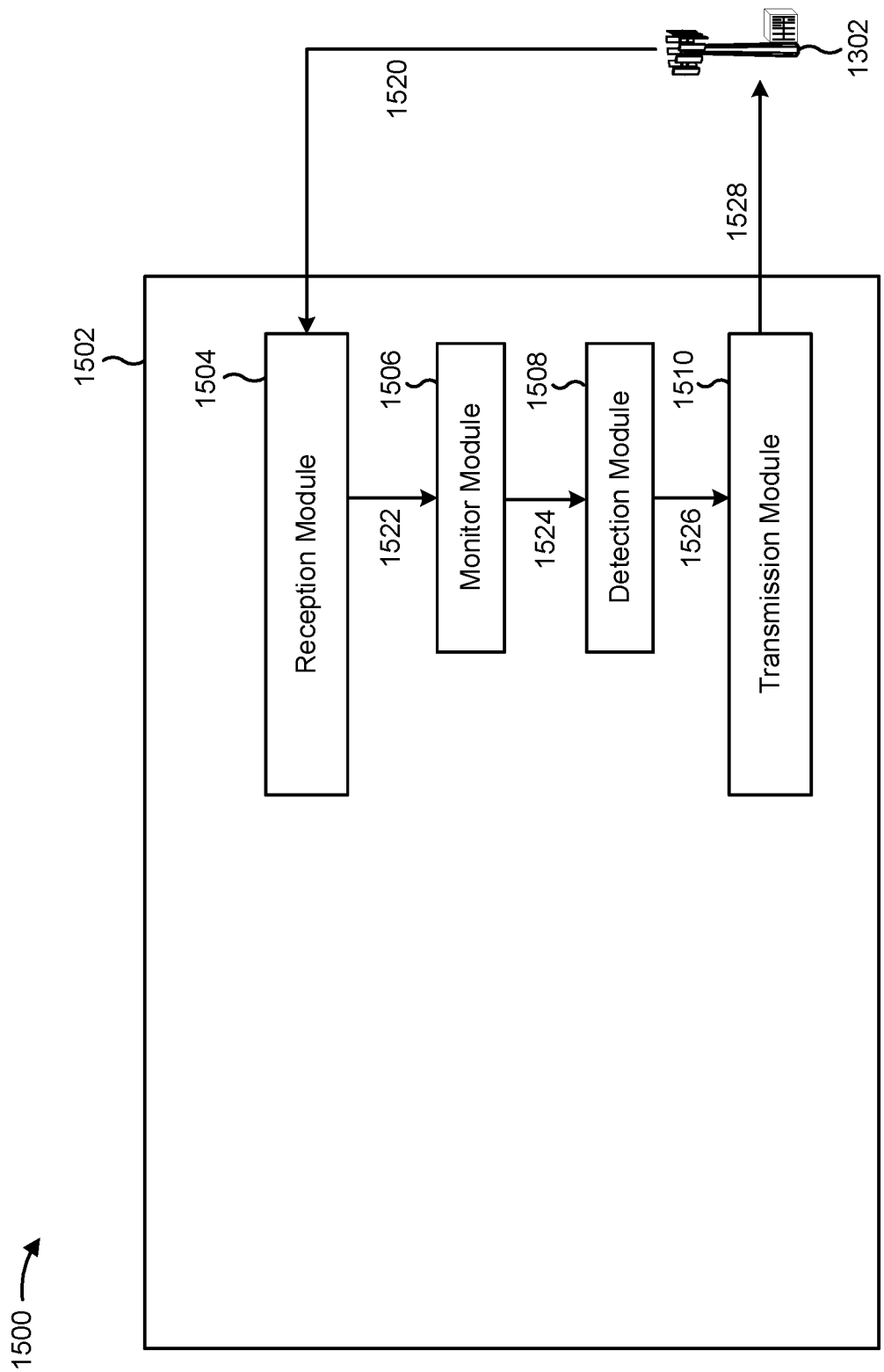
FIG. 15 is a conceptual data flow diagram illustrating data flow between different modules/means/components in an example apparatus.

FIG. 15 is a conceptual data flow diagram 1500 illustrating data flow between different modules/means/components in an example apparatus 1502. The apparatus 1502 may be a UE, such as UE 1330. In some aspects, the apparatus 1502 includes a reception module 1504, a monitor module 1506, a detection module 1508, and a transmission module 1510.

In some aspects, reception module 1504 may receive, as data 1520 from base station 1302, a WUS pool. The WUS pool may be passed as data 1522. Monitor module 1506 may monitor a subset of time resources in the WUS pool. Data 1524 for signals in the subset may be passed to detection module 1508. Detection module 1508 may detect the WUS based at least in part on data 1524. Detection module 1508 may transmit, as data 1526, information about the detection to transmission module 1510. Apparatus 1502 may wake up and transmit communications as data 1528 to base station 1302.

The apparatus may include additional modules that perform each of the blocks of the algorithm in the aforementioned method 1100 of FIG. 11 and/or the like. Each block in the aforementioned method 1100 of FIG. 11, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
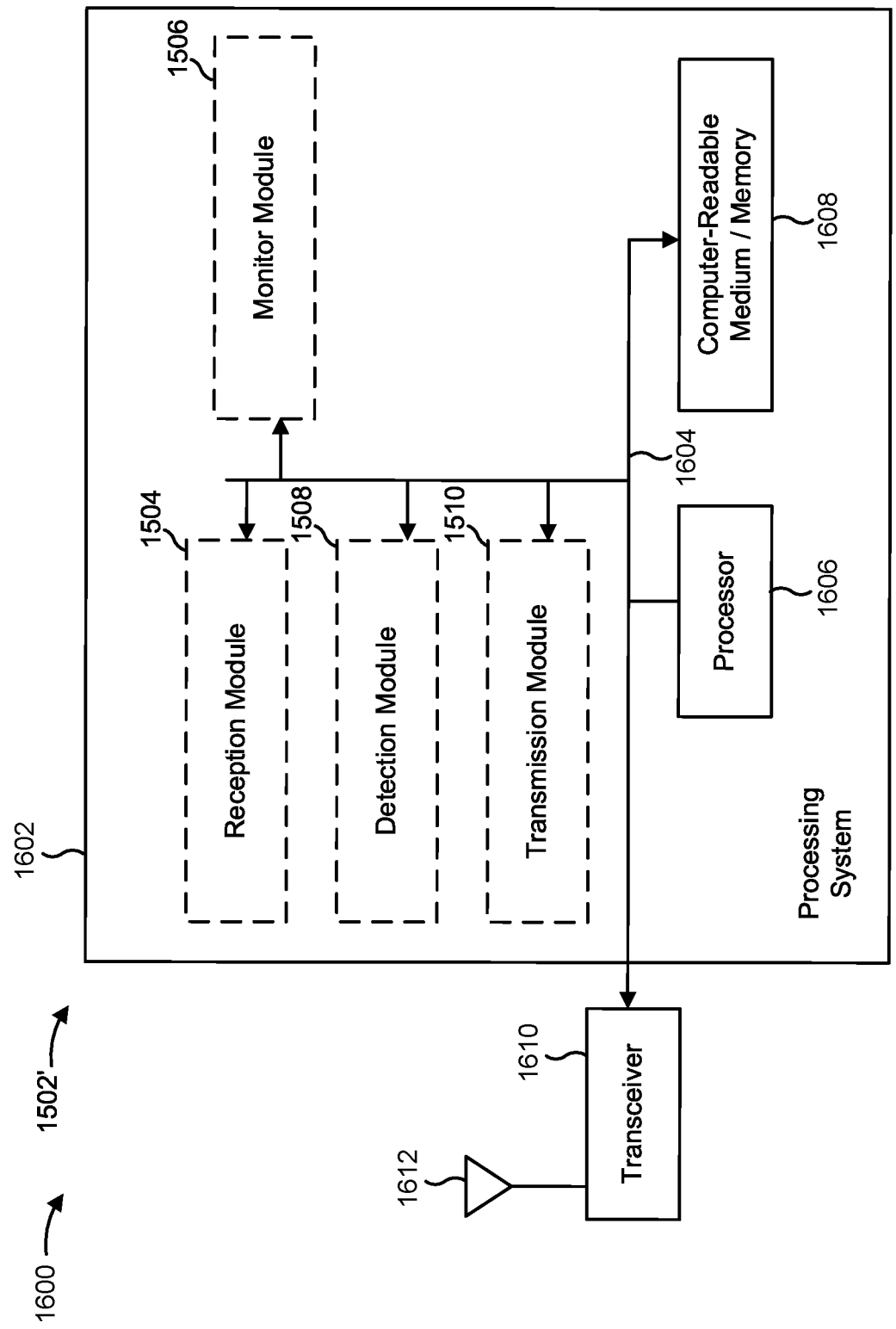
FIG. 16 is a diagram illustrating an example of a hardware implementation for an apparatus employing a processing system.

FIG. 16 is a diagram 1600 illustrating an example of a hardware implementation for an apparatus 1502' employing a processing system 1602. The apparatus 1502' may be a UE.

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, 1510, and the computer-readable medium/memory 1608. The bus 1604 may also link various other circuits such as timing sources, peripherals, voltage regulators, and power management circuits, which are well known in the art, and therefore will not be described any further.

The processing system 1602 may be coupled to a transceiver 1610. The transceiver 1610 is coupled to one or more antennas 1612. The transceiver 1610 provides a means for communicating with various other apparatuses over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1508, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described herein for any particular apparatus. The computer-readable medium/memory 1608 may also be used for storing data that is manipulated by the processor 1606 when executing software. The modules may be software modules running in the processor 1606, resident/stored in the computer readable medium/memory 1608, one or more hardware modules coupled to the processor 1606, or a combination thereof. The processing system 1602 may be a component of the UE 120 and may include the memory 282 and/or at least one of the TX MIMO processor 266, the RX processor 258, and/or the controller/processor 280.

In some aspects, the apparatus 1602/1502' for wireless communication includes means for monitoring a subset of time resources in a WUS pool, where the WUS pool includes contiguous candidate time resources for receiving a WUS, and means for detecting the WUS based at least in part on monitoring the subset of time resources. The aforementioned means may be one or more of the aforementioned modules of the apparatus 1502 and/or the processing system 1602 of the apparatus 1502' configured to perform the functions recited by the aforementioned means. As described elsewhere herein, the processing system 1602 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 16 is provided as an example. Other examples may differ from what is described in connection with FIG. 16.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
monitoring a subset of time resources in a wake up signal (WUS) pool, wherein the WUS pool includes candidate time resources shared by a plurality of UEs for receiving a WUS associated with respective discontinuous reception (DRX) ON durations; and
detecting the WUS based at least in part on monitoring the subset of time resources.

2. The method of claim 1, further comprising determining the subset of time resources based at least in part on a distribution function for distributing time resources within the WUS pool.

3. The method of claim 2, wherein the distribution function is a hash function for randomizing time resource positions of the subset in the WUS pool.

4. The method of claim 2, wherein determining the subset includes determining the subset based at least in part on an identifier of the UE and the distribution function.

5. The method of claim 2, wherein the distribution function is a function for distributing time resource positions of the subset in a pattern in the WUS pool.

6. The method of claim 1, wherein determining the subset includes determining the subset based at least in part on one or more of a decoding capability of the UE, a category of the UE, a cell identifier, or a time slot index.

7. The method of claim 1, wherein monitoring the subset includes monitoring a frequency above 24 GHz.

8. The method of claim 1, wherein monitoring the subset includes monitoring more than a first 3 symbols of a resource block.

9. The method of claim 1, wherein monitoring the subset includes monitoring a physical downlink shared channel.

10. The method of claim 1, wherein the WUS pool is monitored by the plurality of UEs having different DRX ON durations.

11. The method of claim 1, wherein the subset of time resources comprises multiple monitoring occasions corresponding to different beams.

12. A method of wireless communication performed by a base station, comprising:
transmitting a signaling communication that indicates a wake up signal (WUS) pool to monitor for a WUS, wherein the WUS pool includes candidate time resources shared by a plurality of use equipments (UEs) for receiving the WUS associated with respective discontinuous reception (DRX) ON durations; and
transmitting the WUS in the WUS pool.

13. The method of claim 12, wherein the plurality of UEs are associated with a same receiving beam.

14. The method of claim 12, further comprising determining, for each UE of the plurality of UEs, a respective subset of time resources in the WUS pool, based at least in part on a distribution function for distributing time resources within the WUS pool, and wherein transmitting the WUS in the WUS pool includes transmitting the WUS within the respective subsets.

15. The method of claim 14, wherein the distribution function is a hash function for randomizing time resource positions of the respective subset in the WUS pool.

16. The method of claim 14, wherein determining the respective subset for each UE of the plurality of UEs includes determining the respective subset based at least in part on an identifier of the respective UE and the distribution function.

17. The method of claim 14, wherein the distribution function is a function for distributing time resource positions of the respective subset in a pattern in the WUS pool, wherein the pattern is based at least in part on a quantity of the plurality of UEs.

18. The method of claim 14, wherein determining the respective subset for each UE includes determining the respective subset based at least in part on one or more of a decoding capability of the respective UE, a category of the respective UE, a cell identifier associated with a serving cell of the plurality of UEs, or a time slot index.

19. The method of claim 14, further comprising:
selecting one or more WUS time resources from the respective subsets; and
transmitting the WUS to the plurality of UEs on the one or more WUS time resources.

20. The method of claim 19, wherein selecting the one or more WUS time resources from the respective subsets includes selecting a WUS time resource of a subset that overlaps or is adjacent to a WUS time resource of another subset.

21. The method of claim 12, further comprising transmitting the WUS on a frequency above 24 GHz.

22. A user equipment (UE) for wireless communication, comprising:
memory; and
one or more processors coupled to the memory, the memory and the one or more processors configured to:
monitor a subset of time resources in a wake up signal (WUS) pool, wherein the WUS pool includes candidate time resources shared by a plurality of UEs for receiving a WUS associated with respective discontinuous reception (DRX) ON durations; and
detect the WUS based at least in part on monitoring the subset of time resources.

23. The UE of claim 22, wherein the one or more processors are configured to determine the subset of time resources based at least in part on a distribution function for distributing time resources within the WUS pool.

24. The UE of claim 23, wherein the distribution function is a hash function for randomizing time resource positions of the subset in the WUS pool.

25. The UE of claim 23, wherein the one or more processors, to determine the subset, are configured to determine the subset based at least in part on an identifier of the UE and the distribution function.

26. The UE of claim 23, wherein the distribution function is a function for distributing time resource positions of the subset in a pattern in the WUS pool.

27. The UE of claim 22, wherein determining the subset includes determining the subset based at least in part on one or more of a decoding capability of the UE, a category of the UE, a cell identifier, or a time slot index.

28. A base station for wireless communication, comprising:
memory; and
one or more processors coupled to the memory, the memory and the one or more processors configured to:
transmit a signaling communication that indicates a wake up signal (WUS) pool to monitor for a WUS, wherein the WUS pool includes candidate time resources shared by a plurality of UEs for receiving the WUS associated with respective discontinuous reception (DRX) ON durations; and
transmit the WUS in the WUS pool.

29. The base station of claim 28, wherein the one or more processors are configured to determine, for each UE of the plurality of UEs, a respective subset of time resources in the WUS pool, based at least in part on a distribution function for distributing time resources within the WUS pool, and wherein the one or more processors, to transmit the WUS in the WUS pool, are configured to transmit the WUS within the respective subsets.

30. The base station of claim 28, wherein the plurality of UEs are associated with a same receiving beam.

\* \* \* \* \*